(12) United States Patent
Buckley et al.

(10) Patent No.: US 11,036,464 B2
(45) Date of Patent: Jun. 15, 2021

(54) SPATIALIZED AUGMENTED REALITY (AR) AUDIO MENU

(71) Applicant: Bose Corporation, Framingham, MA (US)

(72) Inventors: Daniel James Buckley, Boston, MA (US); Peter Daniel Carpenter, Belmont, MA (US); Colin Richardson Cowles, Somerville, MA (US); Todd Richard Reily, North Reading, MA (US); Michelle Gelberger, Cambridge, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/570,238

(22) Filed: Sep. 13, 2019

(65) Prior Publication Data

US 2021/0081163 A1    Mar. 18, 2021

(51) Int. Cl.
  *G06F 3/16*   (2006.01)
  *G06F 3/01*   (2006.01)
  *H04R 1/10*   (2006.01)

(52) U.S. Cl.
  CPC .............. *G06F 3/165* (2013.01); *G06F 3/017* (2013.01); *H04R 1/10* (2013.01)

(58) Field of Classification Search
  None
  See application file for complete search history.

(56) References Cited

U.S. PATENT DOCUMENTS

| 9,313,359 | B1 | 4/2016 | Stojancic et al. |
| 10,194,259 | B1 | 1/2019 | Martin et al. |

(Continued)

FOREIGN PATENT DOCUMENTS

| EP | 2811389 A1 | 12/2014 |
| WO | 2019173573 A1 | 9/2019 |

OTHER PUBLICATIONS

"Bragi OS—Virtual 4D Menu." E-USE, Mar. 13, 2019, support.e-use.com/hc/en-us/articles/115003122785-Bragi-OS-Virtual-4D-Menu. (Year: 2019).*

(Continued)

*Primary Examiner* — James K Mooney
(74) *Attorney, Agent, or Firm* — Hoffman Warnick LLC

(57) ABSTRACT

Various implementations include approaches for controlling a wearable audio device. In some cases, a method includes: detecting an initiation trigger for initiating a spatialized augmented reality (AR) menu mode; providing at least two distinct audio choices corresponding with spatially delineated zones in a menu defined relative to a physical position of the wearable audio device, in response to the initiation trigger, wherein each audio choice is associated with a selection from the menu; receiving a selection command indicating selection of one of the audio choices, wherein the selection command comprises a gesture detected by a gesture detection system at the wearable audio device; and in response to receiving the selection command: a) initiating playback of audio content associated with the selected audio choice, b) adjusting a setting at the wearable audio device, c) entering an additional menu related to the selection command, or d) exiting the menu.

20 Claims, 9 Drawing Sheets

(56) References Cited

U.S. PATENT DOCUMENTS

| | | | |
|---|---|---|---|
| 2011/0153044 A1* | 6/2011 | Lindahl | G06F 3/167 |
| | | | 700/94 |
| 2013/0154930 A1 | 6/2013 | Xiang et al. | |
| 2013/0194164 A1 | 8/2013 | Sugden et al. | |
| 2013/0335303 A1* | 12/2013 | Maciocci | G02B 27/017 |
| | | | 345/8 |
| 2015/0036835 A1* | 2/2015 | Chen | H04R 1/1041 |
| | | | 381/74 |
| 2015/0208166 A1 | 7/2015 | Raghuvanshi et al. | |
| 2016/0071526 A1 | 3/2016 | Wingate et al. | |
| 2016/0198282 A1 | 7/2016 | Kim et al. | |
| 2016/0286316 A1 | 9/2016 | Bleacher et al. | |
| 2017/0245124 A1 | 8/2017 | Child et al. | |
| 2018/0146198 A1 | 5/2018 | Atlurue et al. | |
| 2019/0090046 A1 | 3/2019 | Milevski | |
| 2019/0146219 A1* | 5/2019 | Rodriguez, II | G06F 3/0304 |
| | | | 345/633 |
| 2019/0324527 A1* | 10/2019 | Presant | G06F 8/31 |

OTHER PUBLICATIONS

Bragi "The Virtual 4d Menu" YouTube transcript (Year: 2017).*
"Bragi (company).", Wikipedia, Aug. 4, 2018, en.wikipedia.org/w/index.php?title=Bragi_(company)&oldid=853397571.(Year: 2018).*
The Virtual 4D Menu, published by Bragi, available via YouTube on May 16, 2017 (screen shot included), available at: https://www.youtube.com/watch?v=VH1eTNWfqKY.
PCT International Search Report and Written Opinion for International Application No. PCT/US2020/050412, dated Dec. 14, 2020, 13 pages.

* cited by examiner

SPATIALIZED AUGMENTED REALITY (AR) AUDIO MENU

TECHNICAL FIELD

This disclosure generally relates to augmented reality (AR) audio control. More particularly, the disclosure relates to audio devices and related methods for enabling device functions with an AR audio menu.

BACKGROUND

Portable electronic devices, including headphones, audio eyeglasses and other wearable audio systems are becoming more commonplace. These portable electronic devices can enable immersive user experiences, for example, using audio to augment the user's perception of the surrounding world and aid in performing a number of tasks. However, these conventional systems fail to capitalize on the various benefits that augmented reality audio can provide.

SUMMARY

All examples and features mentioned below can be combined in any technically possible way.

Various implementations include audio devices and related computer-implemented methods for controlling playback of augmented reality (AR) audio. Certain implementations include approaches for controlling AR audio using a spatialized AR menu mode. Additional implementations include an audio device with a control system for controlling AR audio using a spatialized AR menu mode.

In some particular aspects, a computer-implemented method of controlling a wearable audio device includes: detecting an initiation trigger for initiating a spatialized augmented reality (AR) menu mode; providing at least two distinct audio choices corresponding with spatially delineated zones in a menu defined relative to a physical position of the wearable audio device, in response to the initiation trigger, where each audio choice is associated with a selection from the menu; receiving a selection command indicating selection of one of the audio choices, where the selection command comprises a gesture detected by a gesture detection system at the wearable audio device; and in response to receiving the selection command: a) initiating playback of audio content associated with the selected audio choice, b) adjusting a setting at the wearable audio device, c) entering an additional menu related to the selection command, or d) exiting the menu.

In other particular aspects, a wearable audio device includes: an acoustic transducer having a sound-radiating surface for providing an audio output; a gesture detection system; and a controller coupled with the acoustic transducer and the gesture detection system, the controller configured to: detect an initiation trigger for initiating a spatialized augmented reality (AR) menu mode; provide at least two distinct audio choices corresponding with spatially delineated zones in a menu defined relative to a physical position of the wearable audio device, in response to the initiation trigger, where each audio choice is associated with a selection from the menu; receive a selection command indicating selection of one of the audio choices, where the selection command comprises a gesture detected by the gesture detection system; and in response to receiving the selection command: a) initiate playback of audio content associated with the selected audio choice, b) adjust a setting at the wearable audio device, c) enter an additional menu related to the selection command, or d) exit the menu.

Implementations may include one of the following features, or any combination thereof.

In some cases, the method further includes providing a prompt to initiate the spatialized AR menu mode, where the initiation trigger comprises an affirmative response to the prompt.

In certain implementations, the initiation trigger comprises a user interface command, a multi-modal gesture, a sensor input, or detected activity by a mobile application running on the wearable audio device.

In particular aspects, the menu further comprises a default set of selections comprising: an exit selection for exiting the spatialized augmented reality (AR) menu mode; and a repeat selection for repeating playback of the at least two audio choices.

In some cases, the gesture detection system comprises an inertial measurement unit (IMU) at the wearable audio device.

In certain implementations, the menu comprises four spatially delineated zones.

In particular aspects, the four spatially delineated zones comprise: a pair of horizontally aligned zones, each corresponding with the at least two distinct audio choices, where the pair of horizontally aligned zones are aligned with left and right movement, respectively, relative to a neutral orientation of the wearable audio device; and a pair of vertically aligned zones, each corresponding with default menu selections, where the pair of vertically aligned zones are aligned with up and down movement, respectively, relative to the neutral orientation of the wearable audio device.

In some implementations, the default menu selections comprise a repeat playback selection and an exit menu selection, respectively.

In certain aspects, the gesture comprises a multi-modal gesture.

In particular implementations, the selection command is only detected in response to detecting the multi-modal gesture, where the multi-modal gesture mitigates false positive selections.

In some aspects, initiating the spatialized AR menu mode comprises at least one of: outputting introductory audio content about at least one of the spatially delineated zones in the menu, outputting a signature tone associated with the menu, or outputting a signature tone indicating an entity associated with the menu.

In certain cases, the introductory audio content is output as spatialized audio in a direction in which a user of the wearable audio device must turn to select one of the audio choices.

In some aspects, the menu is rendered by an application programming interface (API) calling component from a set of inputs to an API interface, where the API interface permits insertion of the at least two distinct audio choices as audio files into pre-defined entries assigned to the spatially delineated zones.

In particular implementations, the setting comprises at least one of: a volume of audio playback at the wearable audio device, a noise canceling or noise reduction setting at the wearable audio device; and the additional menu provides: a) one of: device information about the wearable audio device, the device information comprising at least one of: a battery level of the wearable audio device, product information about the wearable audio device, or other operating modes for the wearable audio device; or b) one of:

content selection options for the audio playback, purchasing selection options from an external commerce application.

In certain cases, the initiation trigger comprises a user command comprising at least one of a tactile actuation or a voice command at the wearable audio device or another device, and the selection command comprises at least one of a tactile actuation, gesture actuation, or voice command at the wearable audio device or another device.

In some aspects, the menu of spatially delineated zones comprises a one-dimensional array or a two-dimensional array, and neighboring spatially delineated zones are separated from one another by approximately at least 20 degrees of rotation laterally or approximately at least 15 degrees vertically.

In certain cases, a user of the wearable audio device, upon initiating the spatialized AR menu mode, is provided with an introductory audio choice defining selection options for each of the spatially delineated zones in the menu defined relative to the physical position of the wearable audio device, and in response to a change in the physical position of the wearable audio device to a physical position associated with one of the spatially delineated zones, one of the at least two distinct audio choices is provided at the wearable audio device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
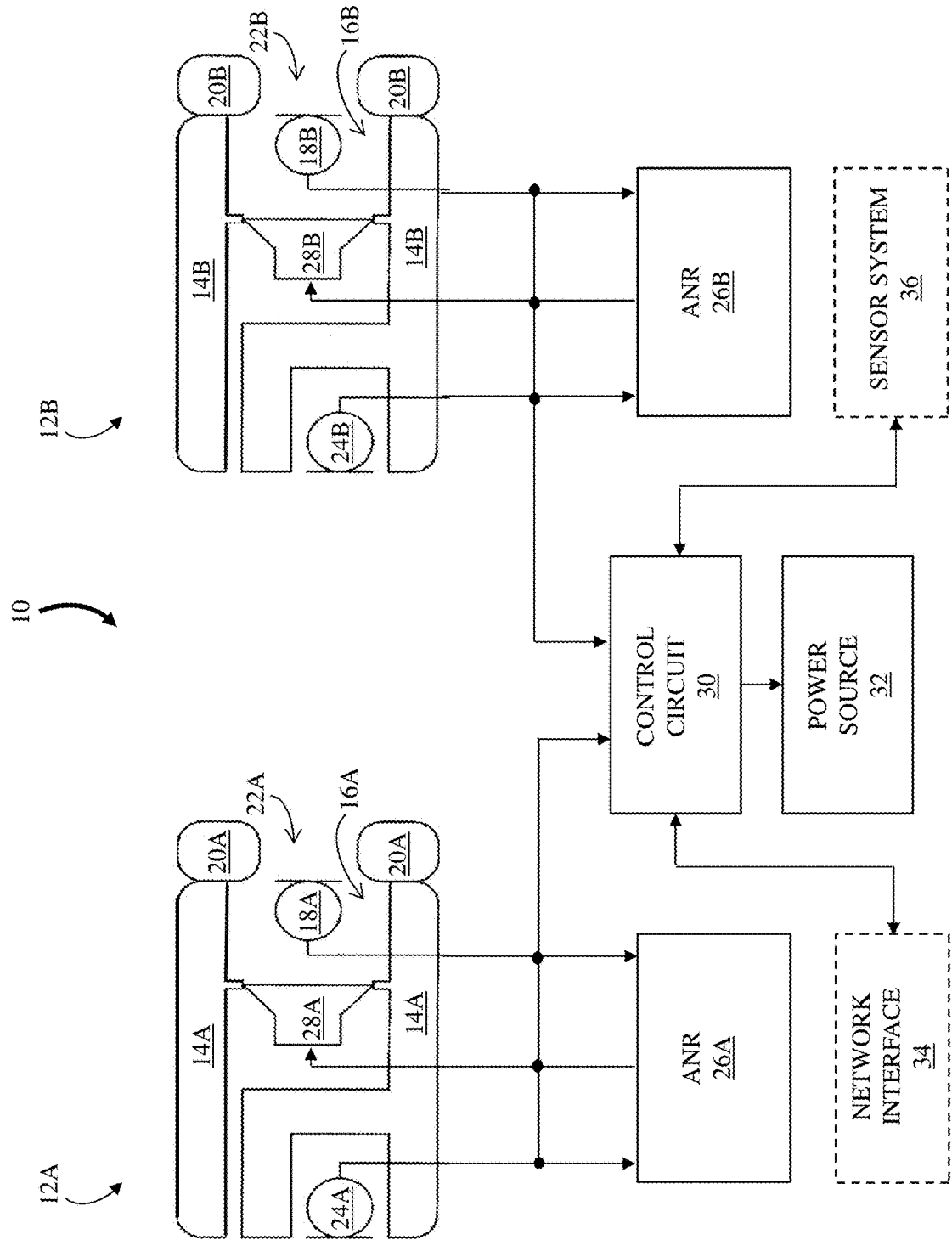
FIG. 1 is a schematic depiction of an example audio device according to various implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a spatialized augmented reality (AR) menu can provide an intuitive, engaging mechanism for executing audio device functions as well as functions of one or more connected applications. In certain implementations, a user can initiate an AR menu with a wearable audio device to select one or more device or application functions. In various implementations, the AR menu allows the user to remain head up and hands free while navigating selection options.

Various aspects of controlling AR audio functions are described in U.S. patent application Ser. No. 16/511,375 ("Multi-Application Control of Augmented Reality Audio") filed on Jul. 15, 2019; U.S. patent application Ser. No. 16/295,717 ("Systems and Methods for Controlling Electronic Devices", filed on Mar. 7, 2019; and U.S. patent application Ser. No. 16/370,029 ("Methods and Systems for Establishing User Controls", filed on Mar. 29, 2019, each of which is incorporated by reference in its entirety.

Commonly labeled components in the FIGURES are considered to be substantially equivalent components for the purposes of illustration, and redundant discussion of those components is omitted for clarity.

Aspects and implementations disclosed herein may be applicable to a wide variety of audio devices including personal audio devices, such as a portable speaker, headphones, and wearable audio devices in various form factors, such as watches, glasses, neck-worn speakers, helmets with integrated speakers, shoulder-worn speakers, body-worn speakers, etc. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes headphones and various other types of personal audio devices such as head, shoulder or body-worn acoustic devices that include one or more acoustic drivers to produce sound without contacting the ears of a user. Some particular aspects disclosed may be particularly applicable to personal (wearable) audio devices such as glasses, headphones, earphones or other head-mounted audio devices (e.g., helmets with integrated speakers).

Audio Device

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. In implementations where personal audio device (or simply, audio device) 10 is ear-mountable, an ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include active noise reduction (ANR), the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24 and performs an ANR process for the corresponding earpiece 12. As described herein, in addition to providing an anti-noise acoustic signal, electroacoustic transducer 28 can utilize its sound-radiating surface for providing an audio output for playback.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP), and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a user (e.g., wearer) may be provided or altered, and a device in communication with the personal audio device may be controlled. The audio device 10 also includes a power source 32. The control circuit 30 and power source 32 may be in one or both of the earpieces 12 or may be in a separate housing in communication with the earpieces 12. The audio device 10 may also include a network interface 34 to provide communication between the audio device 10 and one or more audio sources, other networked (e.g., wireless) speaker packages and/or other audio playback devices via one or more communications protocols. Additional description of the control circuit 30 (e.g., including memory and processing function), network interface 34 (e.g., including network media processor functions) and other features of the audio device 10 can be found in U.S. patent application Ser. No. 16/179,205 ("Spatialized Virtual Personal Assistant"), filed on Nov. 2, 2018, which is herein incorporated by reference in its entirety.

As shown in FIG. 1, audio device 10 can also include a sensor system 36 coupled with control circuit 30 for detecting one or more conditions of the environment proximate audio device 10. Sensor system 36 can include inner microphones 18 and/or outer microphones 24, sensors for detecting inertial conditions at the audio device 10 and/or conditions of the environment proximate audio device 10 as described herein. The sensors may be on-board the audio device 10, or may be remote or otherwise wireless (or hard-wired) connected to the audio device 10. As described further herein, sensor system 36 can include a plurality of distinct sensor types for detecting inertial information, environmental information, or commands at the audio device 10. In particular implementations, sensor system 36 can enable detection of user movement, including movement of a user's head or other body part(s), and/or the look direction of a user. In particular, portions of sensor system 36 may incorporate one or more movement sensors, such as accelerometers gyroscopes and/or magnetometers. In some particular implementations, sensor system 36 can include one or more inertial measurement units (IMUs) having three-dimensional (3D) accelerometers, gyroscopes and a magnetometer.

In various implementations, the sensor system 36 can be located at the audio device 10, e.g., where an IMU is physically housed in the audio device 10. In some examples, the sensor system 36 (e.g., including the IMU) is configured to detect a position, or a change in position, of the audio device 10. This inertial information can be used to control various functions described herein. For example, the inertial information can be used to trigger a command function, such as activating an operating mode of the audio device 10 (e.g., AR menu mode), modifying playback of an audio file, or adjusting a setting on the audio device 10, etc. The sensor system 36 can also include one or more interface(s) for receiving commands at the audio device 10, e.g., permitting a user to initiate functions of the audio device 10. In a particular example implementation, the sensor system 36 can include, or be coupled with, a capacitive touch interface for receiving tactile commands on the audio device 10. In other implementations, as illustrated in the phantom depiction in FIG. 1, one or more portions of the sensor system 36 can be located at another device capable of indicating inertial, location, or other information about the user of the audio device 10.

Data Flow

Figure 2:
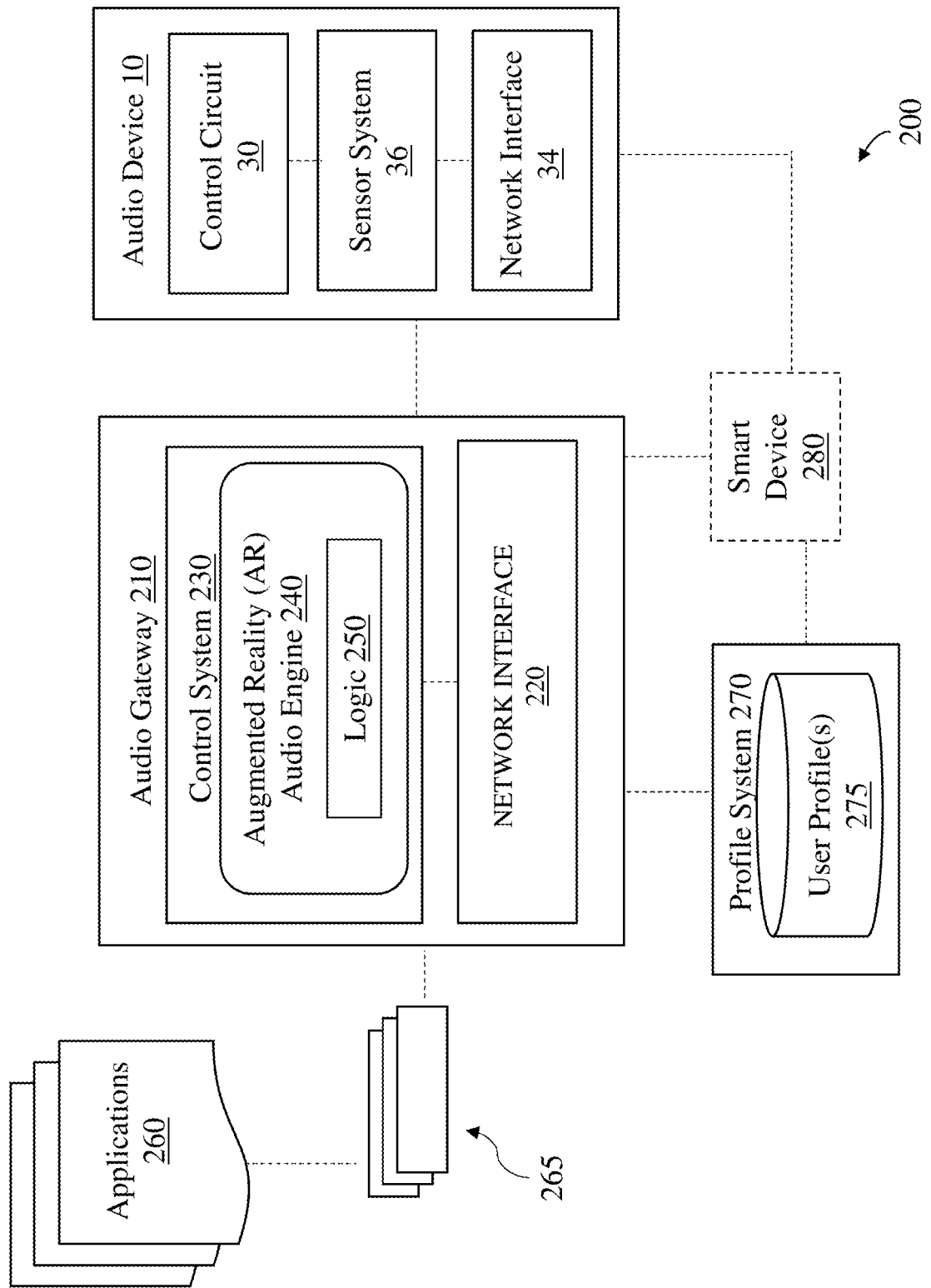
FIG. 2 is data flow diagram illustrating interaction between devices running an augmented reality audio engine in an environment according to various implementations.

As described with respect to FIG. 1, control circuit 30 can execute (and in some cases store) instructions for controlling AR audio functions in audio device 10 and/or other audio playback devices in a network of such devices. FIG. 2 shows a schematic depiction of data flows in a system 200 including the audio device 10 connected with an audio gateway device (audio gateway) 210. The audio device 10 and audio gateway 210 can be paired according to any connection described herein, e.g., a wireless connection such as Bluetooth, WiFi or Zigbee. Example configurations of an audio gateway 210 can include a cellular phone, personal data assistant (PDA), tablet, personal computer (PC), wearable communication system, or any other known audio gateway for providing audio content to audio device 10. In particular implementations, the audio gateway 210 includes a network interface 220, which can include, e.g., a wireless transceiver configured to communicate over any wireless protocol described herein.

Audio gateway 210 can further include a control system 230 configured to execute control functions in the AR menu mode at the audio device 10. The control system 230 can include a microprocessor, memory, and other conventional control hardware/software for executing functions described herein. In some cases, control system 230 can include similar components as those described with respect to control circuit 30 in FIG. 1. In various implementations, control system 230 can have additional processing and/or storage capabilities not present at the control circuit 30 in audio device 10. However, in various implementations, actions performed by control system 230 can be executed at the control circuit 30 on audio device 10 to provide augmented reality (AR) audio functions described herein. In particular implementations, control system 230 includes an augmented reality (AR) audio engine 240 or otherwise accesses program code for executing processes performed by AR audio engine 240 (e.g., via network interface 220). AR audio engine 240 can include logic 250 for executing functions described herein. Both audio gateway 210 and audio device 10 are shown in simplified form in FIG. 2 to focus illustration on functions described according to the AR audio engine 240.

In various particular implementations, AR audio engine 240 is configured to coordinate audio outputs at the transducer (e.g., speaker) 28 (FIG. 1) of the audio device 10 to provide audio choices (also referred to as audio menu options) corresponding with spatially delineated zones in a menu that is defined relative to the physical position of the audio device 10, receive a selection command from user based on the menu (e.g., gesture-based selection command), and take one of a plurality of actions based upon the selection command. In various implementations, each audio choice is associated with a selection from the menu, and is spatially rendered to clearly delineate the menu options. The menu can provide options for controlling audio content and/or settings at the audio device 10, multi-step menu selection, and/or entry and exit from the menu(s).

FIG. 2 illustrates data flows between components in system 200 (e.g., audio device 10 and audio gateway 210), as well as between those components and additional devices. It is understood that one or more components shown in the data flow diagram may be integrated in the same physical housing, e.g., in the housing of audio device 10, or may reside in one or more separate physical locations. In various implementations, the AR audio engine 240 is connected (e.g., via the audio gateway 210) with a set of applications 260, which may run locally at a given device (e.g., audio device 10 and/or smart device 280), or may be running in a cloud-based system (server) connected with that device. The AR audio engine 240 is also connected with a profile system 270 including user profiles 275. In additional implementations, the AR audio engine 240 can also be connected with a smart device 280.

In various implementations, the AR audio engine 240 runs as a control application at the audio device 10, audio gateway 210 and/or smart device 280 for functions from a set of distinct (software) applications 260. In still further implementations, the AR audio engine 240 runs as a control application at a cloud-based or other distributed computing system (server), such as in the case that the software applications 260 are run at the same or a similar system. The AR audio engine 240 can run continuously for a period, e.g., when enabled, in order to act as a gateway for menus 265 and other notifications from those applications 260. In some cases, applications 260 can include one or more of the following application types for providing information in an AR menu: a calendar application providing reminders about upcoming events, an audio streaming application providing notifications about available content, a communications application providing notifications about incoming phone calls or video calls, a health monitoring application providing notifications about vital signs and/or recommending increases, decreases or other modifications to activity level based upon the vital signs, a recreation or sporting application providing notifications about location-specific AR menus (e.g., a golf pin locator/range finder), etc.

In particular implementations, the logic 250 in AR audio engine 240 is configured to process sensor data, contextual data, and/or user input data from the audio device 10 and/or additional sources (e.g., smart device 280, profile system 270, etc.) and execute various control functions. For example, the AR audio engine 240 is configured to receive sensor data from the sensor system 36, data from one or more applications running at the audio gateway 210 and/or the smart device 280 and/or user profile data (e.g., from profile system 270). In various implementations, the AR audio engine 240 is also configured to receive selection commands from a user from the AR menu (e.g., via gesture-based commands), and execute functions associated with the selection command(s).

AR audio engine 240 (including logic 250, related software and/or hardware) can be located at the audio device 10, audio gateway 210 or any other device described herein (e.g., smart device 280), and can execute functions at one or more devices and/or components described herein. In some cases, the AR audio engine 240 is an entirely hardware implementation, an entirely software implementation (including firmware, resident software, micro-code, etc.) or an implementation combining software and hardware aspects that may all generally be referred to herein as an "engine."

Additionally, the AR audio engine 240 can take the form of a computer program product embodied in any tangible medium of expression having computer-usable program code embodied in the medium. In various particular implementations, the AR audio engine 240 executes functions described herein according to logic 250, which can be stored or otherwise accessed by any device capable of performing those functions, e.g., audio gateway 210, audio device 10 or other device(s) described herein.

User profiles 275 may be user-specific, community-specific, device-specific, location-specific or otherwise associated with a particular entity such as the user. User profiles 275 can include user-specific notification settings, audio messages stored by the user of audio device 10, or another user, or other audio content available from network audio sources coupled with network interfaces 34 and/or 220. In some cases, profile system 270 is located in a local server, or a cloud-based server, similar to any such server described herein. Profile system 270 can be associated with any community of users, e.g., employees in a workplace, a social network, subscription-based music service, etc.

In addition to the profile system 270, the AR audio engine 240 can additionally be coupled (e.g., wirelessly and/or via hardwired connections in personal audio device 10) with an audio library (not shown), which can include audio content (e.g., audio file(s), playlist(s) of audio files, podcast(s), an audio stream or an Internet radio station, location-specific audio pins, condition-specific audio files and/or streams, or one or more audibly presented selections) for playback (e.g., streaming or otherwise rendering) at audio device 10.

As shown herein, AR audio engine 240 can also be coupled with a separate smart device 280. The smart device 280 is shown in phantom because it may be a separate component from the device executing the AR audio engine 240, however, it is understood that in various implementations, the audio gateway 210 is located at the smart device 280. The AR audio engine 240 can have access to a user profile (e.g., profile 275) and/or biometric information about the user of audio device 10. In some cases, the AR audio engine 240 directly accesses the user profile and biometric information, however, in other cases, the AR audio engine 240 can access the user profile and/or biometric information via a separate smart device 280. It is understood that smart device 280 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 280 can include a conventional user interface for permitting interaction with a user, and can include one or more network interfaces for interacting with control circuit 30 and/or control system 230 and other components in audio device 10. Additional capabilities of the smart device 280 are described in U.S. patent application Ser. No. 16/511,375, previously incorporated by reference herein.

As described herein, AR audio engine 240 is configured to receive sensor data about one or more activity states of the audio device 10 from sensor system 36. In various particular implementations, the sensor system 36 can include an IMU for providing inertial information about the audio device 10 to the AR audio engine 240. In various implementations, this inertial information can include orientation, translation and heading. For example, inertial information can include changes in heading (e.g., from an absolute value relative to magnetic north), changes in orientation (e.g., roll, pitch, yaw), and absolute translation (e.g., changes in x-direction, y-direction, z-direction). Additionally, inertial information can include first and second derivatives (i.e., velocity and acceleration) of these parameters. In particular examples, the AR audio engine 240, including logic 250, is configured to calculate spatially rendered audio locations proximate the audio device for audio output using inputs such as audio pin angle, IMU azimuth angle and persistent azimuth, as described in U.S. Pat. No. 10,194,259 ("Directional Audio Selection"), which is hereby incorporated by reference in its entirety. In additional implementations, sensor system 36 can include additional sensors for detecting conditions at the audio device 10, for example: a position tracking system; and a microphone (e.g., including one or more microphones). It is understood that any number of additional sensors can be incorporated in sensor system 36. Additional details about specific sensor types and functions, along with actuation mechanisms and cues in the audio device 10 and/or smart device 280 can be found in U.S. patent application Ser. No. 16/179,205 ("Spatialized Virtual Personal Assistant"), previously incorporated by reference herein.

In additional implementations, the AR audio engine 240 is configured to provide audio choices as spatially rendered audio using the transducer (e.g., speaker) 28 (FIG. 1) at audio device 10 in response to detecting one or more initiation triggers from audio device 10 or another connected device such as audio gateway 210 and/or smart device 280. For example, initiation triggers can include a user interface command, multi-modal gesture or sensor input detected at the audio device 10, audio gateway 210 and/or smart device 280. In additional implementations, initiation triggers include detected activity by a mobile application (e.g., software application) running on the audio device 10. Additional triggers can include proximity triggers such as proximity to a Bluetooth beacon (e.g., BLE beacon), or a GPS location trigger. In still further implementations, initiation triggers can include device functions (e.g., functions of the audio device 10 such as timer/alarm mechanisms, changes in noise cancellation settings, etc.). These triggers and mechanisms can be used in conjunction with other actuation mechanisms described herein (e.g., application data-based actuation, timing-based actuation, weather data-based actuation, voice actuation, gesture actuation, tactile actuation) to control initiation of the spatialized AR menu mode.

As additionally noted herein, the AR audio engine 240 can be configured to detect or otherwise retrieve contextual data about the user and/or usage of the audio device 10. For example, the AR audio engine 240 can be configured to retrieve contextual data from one or more applications running at the audio gateway 210 and/or the audio device 10, such as a workplace management application, calendar or organizational application, email or messaging application, social media application, travel application, shopping application, fitness application, etc. The AR audio engine 240 can also be configured to detect that the user is engaging one or more device functions, for example, that the user is on a phone call or actively sending/receiving messages with another user using the audio gateway 210.

As described herein, in some implementations, the AR audio engine 240 is configured to output audio choices, such as menu selection options, in spatialized form. In some cases, audio choices can include a spatialized audio file configured for playback (which in some cases is binaural). In these cases, the spatialized audio file is configured for output at a spatially rendered audio location, or multiple spatially rendered audio locations, relative to the user. For example, the spatialized audio file can be configured for playback at one or more spatially rendered audio locations relative to the user's look direction (e.g., as detected by sensors at sensor system 36 and/or smart device 280), or relative to a physical location proximate the user. In other cases, the notification includes a monaural audio file, a stereo audio file, a spatialized audio file or a multichannel audio file. Application of spatialized audio functions in particular devices is further described in U.S. Pat. No. 10,194,259, previously incorporated by reference herein. In particular cases, the audio choice is output at the audio device 10 in a spatially rendered audio location that is defined relative to a look direction of the user (e.g., the user's head direction or eye focus direction) or relative to a physical location proximate the user. In additional particular implementations, the AR audio engine 240 outputs the audio playback associated with the choice according to an application setting, a location of the audio device 10, the look direction of the user, contextual information about what a user is doing, and/or a type of the playback condition data.

As noted herein, in various implementations, rules for initiating a spatialized AR menu mode can be settings-specific, location-specific, device-specific, time-specific, weather-specific, movement-specific, event-specific, specifically tailored to interaction with other users, or otherwise tailored to particular user experiences. In some cases, AR audio engine 240 presents a spatialized AR menu to the user that is related to a particular location, e.g., when the user approaches that location, and can also present a spatialized AR menu based upon the direction in which the user is facing (e.g., looking). In some directionally-specific cases, the playback of the audio choice can include narrative audio such as introductory information about additional content associated with one or more look directions.

Example Process Flow

Figure 3:
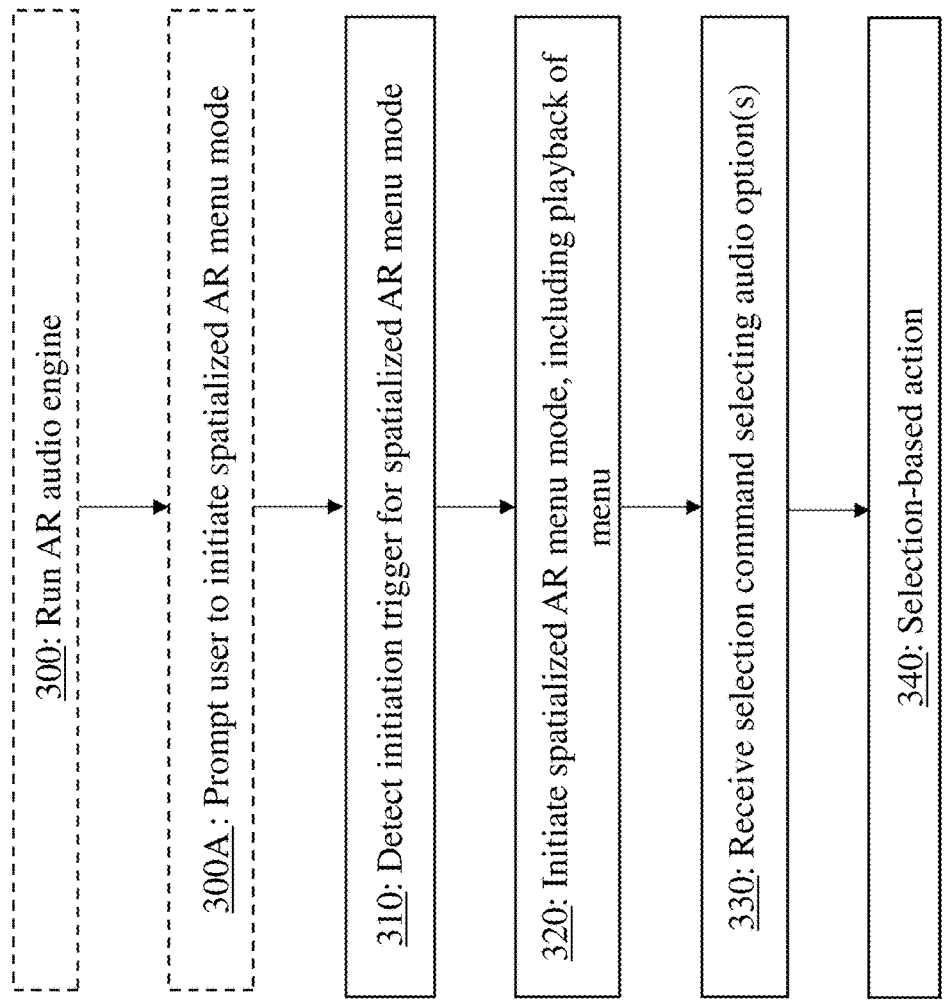
FIG. 3 is a flow diagram illustrating processes performed by the augmented reality audio engine shown in FIG. 2.

During operation, the AR audio engine 240 is configured to control playback of AR audio at the audio device 10 according to various triggers (or, rules). In particular implementations, the AR audio engine 240 is configured to initiate an AR menu mode at the audio device based upon one or more initiation triggers. In various implementations, the AR audio engine 240 acts as a gateway for AR audio menus 265 designated by distinct applications 260 (FIG. 2), programmers or users, and renders those menus 265 according to a set of AR audio rules. FIG. 3 illustrates a general process flow in controlling AR menu modes as performed by the AR audio engine 240. FIGS. 2 and 3 are referred to concurrently.

As shown, a preliminary (e.g., optional) process 300 includes running the AR audio engine 240 (also referred to as a "control application") as a gateway for AR menus 265 from distinct applications 260. In various implementations, the AR audio engine 240 is run (e.g., executed) at the audio device 10, audio gateway 210, smart device 280 and/or in a remote or distributed server such as a cloud-based server. In some cases, while the AR audio engine 240 is running, the other applications 260 providing menus 265 are run in a background state. In certain implementations, the AR audio engine 240 can queue menus 265 from applications 260, independent of the menu source (e.g., application based menus, cloud-based menus, etc.). In some cases, the AR audio engine 240 is configured to act as a gateway for playback of AR audio menus 265 from applications 260. However, in particular cases, the AR audio engine 240 is configured to control the content and playback of one or more AR audio menus, e.g., as output at the transducers 28 on audio device 10.

In process 310, the AR audio engine 240 detects an initiation trigger for initiating a spatialized AR menu mode. As noted herein, initiating triggers can take any of a number of forms, including user interface commands, multi-modal gestures, sensor inputs, detected activity by an application 260 running on the audio device 10, etc. In particular cases, the initiation trigger is a user command including a tactile actuation (e.g., double tap on a capacitive touch or other touch interface, tap-and-hold command on the touch interface, tap-and-turn gesture using a touch interface and gesture-based trigger, etc.) or a voice command (e.g., "Bose, please enter AR menu mode", or "Bose, please provide device settings menu") that is detected at the audio device 10 or another device (e.g., audio gateway 210 or smart device 280).

In some examples, prior to detecting an initiation trigger, the AR audio engine 240 provides a prompt to the user to initiate the spatialized AR menu mode (process 300A, FIG. 3). In various implementations, the AR audio engine 240 prompts the user to initiate the spatialized AR menu mode based upon detecting a notification or other trigger from an application 260, a detected location of the audio device 10 (e.g., proximate a place of interest, known travel route, etc.), a time of day, a calendar event, a device setting at the audio device 10 (e.g., low power mode, or noise cancelation mode), etc. That is, in various implementations, the AR audio menus 265 can be settings-specific, location-specific, specifically tailored to a user command or query (e.g., VPA query), or otherwise tailored to particular user experiences. In some cases, AR audio engine 240 prompts the user to enter an AR audio menu 265 that is related to a particular location, e.g., when the user approaches that location. In other examples, the AR audio engine 240 prompts the user to enter an AR audio menu 265 at a particular time of day (e.g., to play one of a select group of nighttime playlists or audio books at bedtime). The prompt can take the form of any user interface prompt, e.g., an audio prompt, a user interface (e.g., visual) prompt, a tactile (e.g., vibrational) prompt, etc. In some cases, the initiation trigger is an affirmative response to the prompt, e.g., within a response period such as a matter of seconds or minutes. In some cases, the affirmative response can include a nod or other gesture (e.g., multi-modal gesture), a response to a user interface prompt such as selecting a "Yes" or "Enter Menu" button on an interface at one of the devices in system 200, or a voice response from the user such as "Yes" or "Enter Menu".

In any case, in response to the initiation trigger, the AR audio engine 240 is configured to initiate the spatialized AR menu mode (process 320, FIG. 3). As used herein, each menu can include one or more audio files, that when played at the audio device 10, are output as at least two distinct audio choices (or, menu options) corresponding with spatially delineated zones. In some cases, playback of the audio choices can be provided to the user in a band-limited playback format. That is, the audio choices (menu options) associated with each zone can be provided (e.g., at transducer(s)) in a band-limited playback. In various implementations, the band-limited playback includes spatially rendered playback of monaural sources. This spatially rendered playback of monaural sources can take multiple forms. For example, the sources of audio choices can be presented as monaural playback to the user, but in practice, the AR audio engine 240 can provide a stereo mix of multiple mono sources to place those choices in the physical space around the user. In other cases, AR audio engine 240 provides monaural playback of each choice (option), e.g., to reduce latency. As described further herein, the menu playback can be differentiated from playback of other sources of audio content (e.g., music, podcast, navigation directions) to further indicate to the user that the AR audio engine 240 is operating in spatialized AR menu mode.

Figure 4:
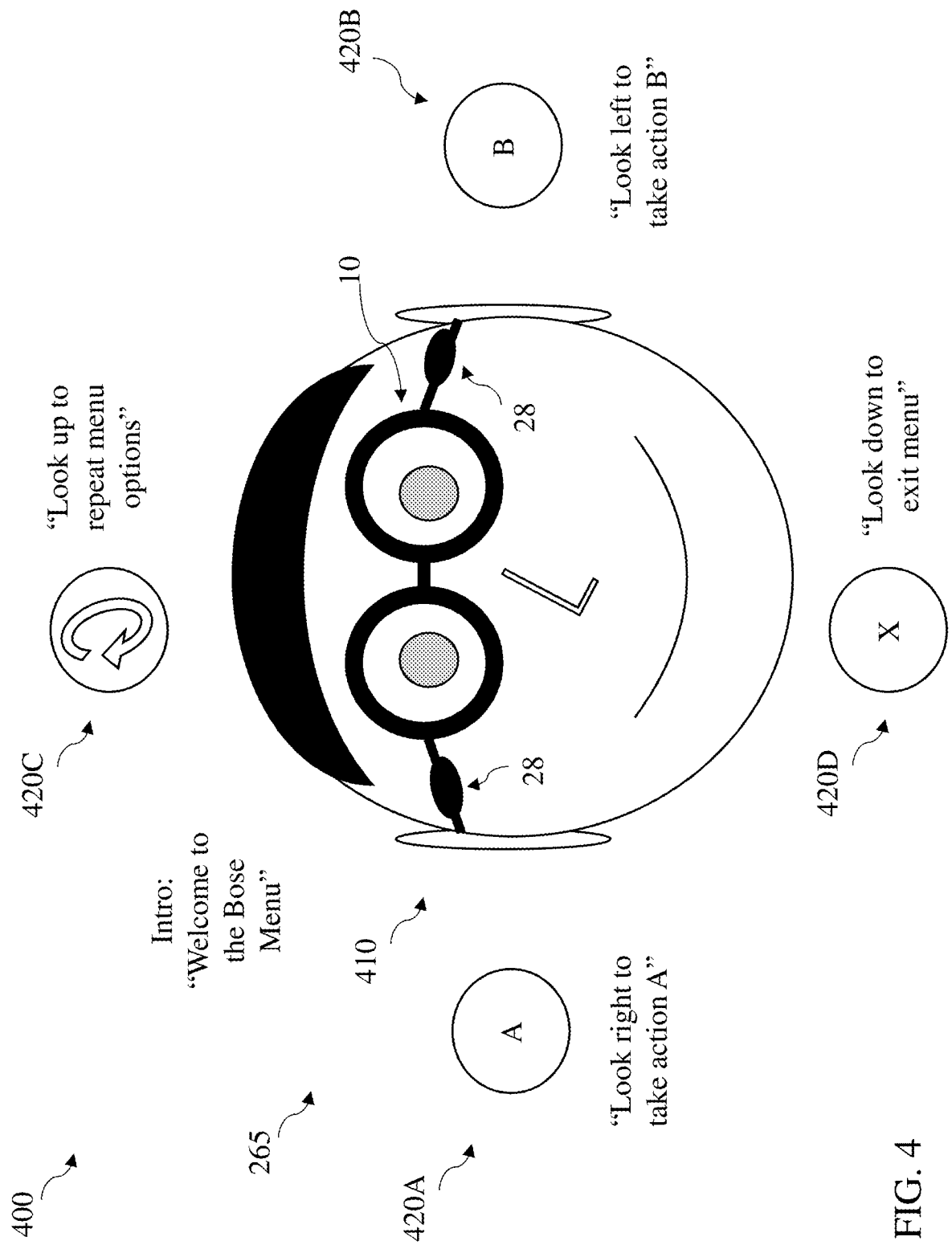
FIG. 4 shows an example schematic depiction of a user interacting with a spatialized augmented reality menu according to various implementations.
Figure 5:
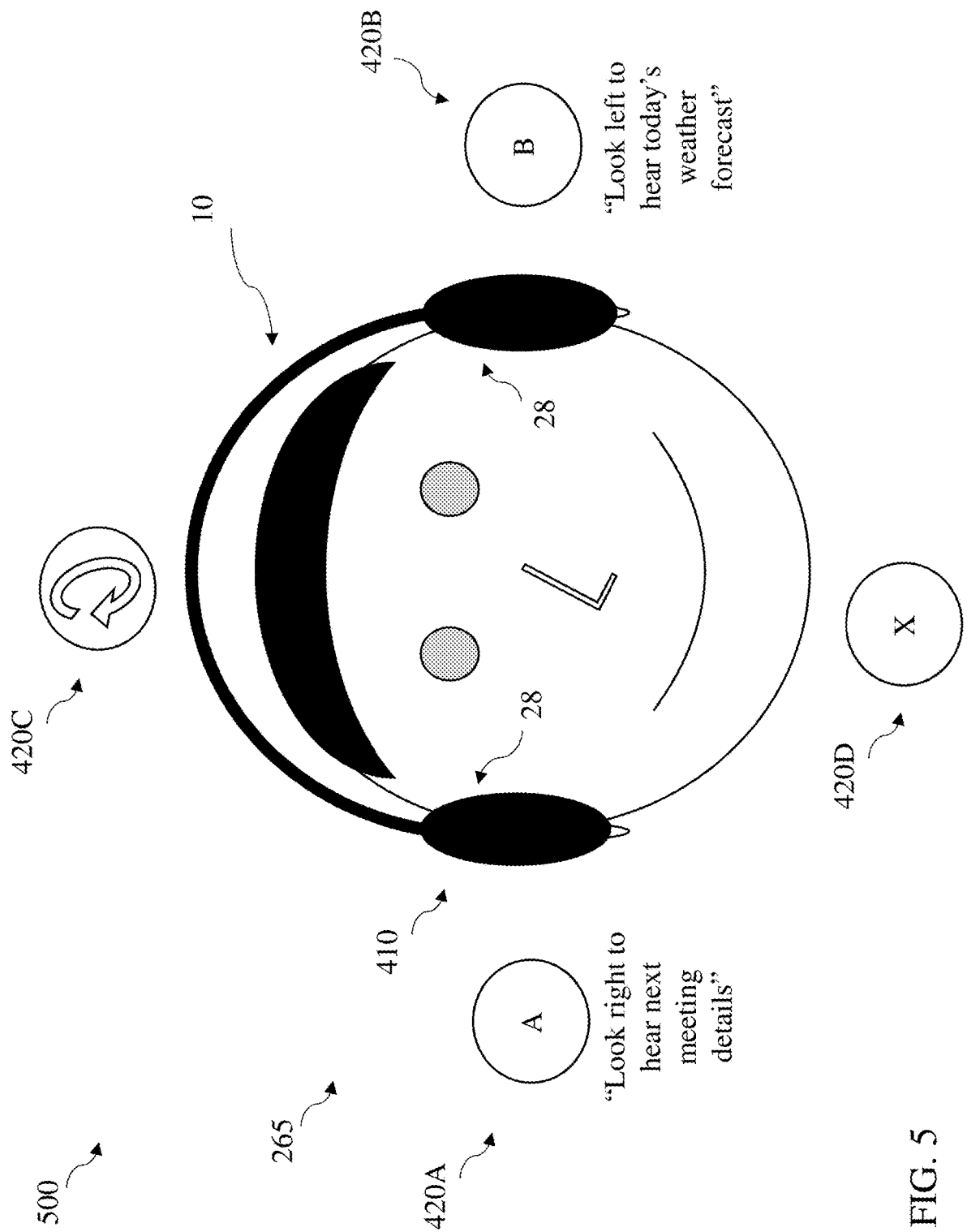
FIG. 5 shows an example interface for defining menu selection options according to various implementations.
Figure 6:
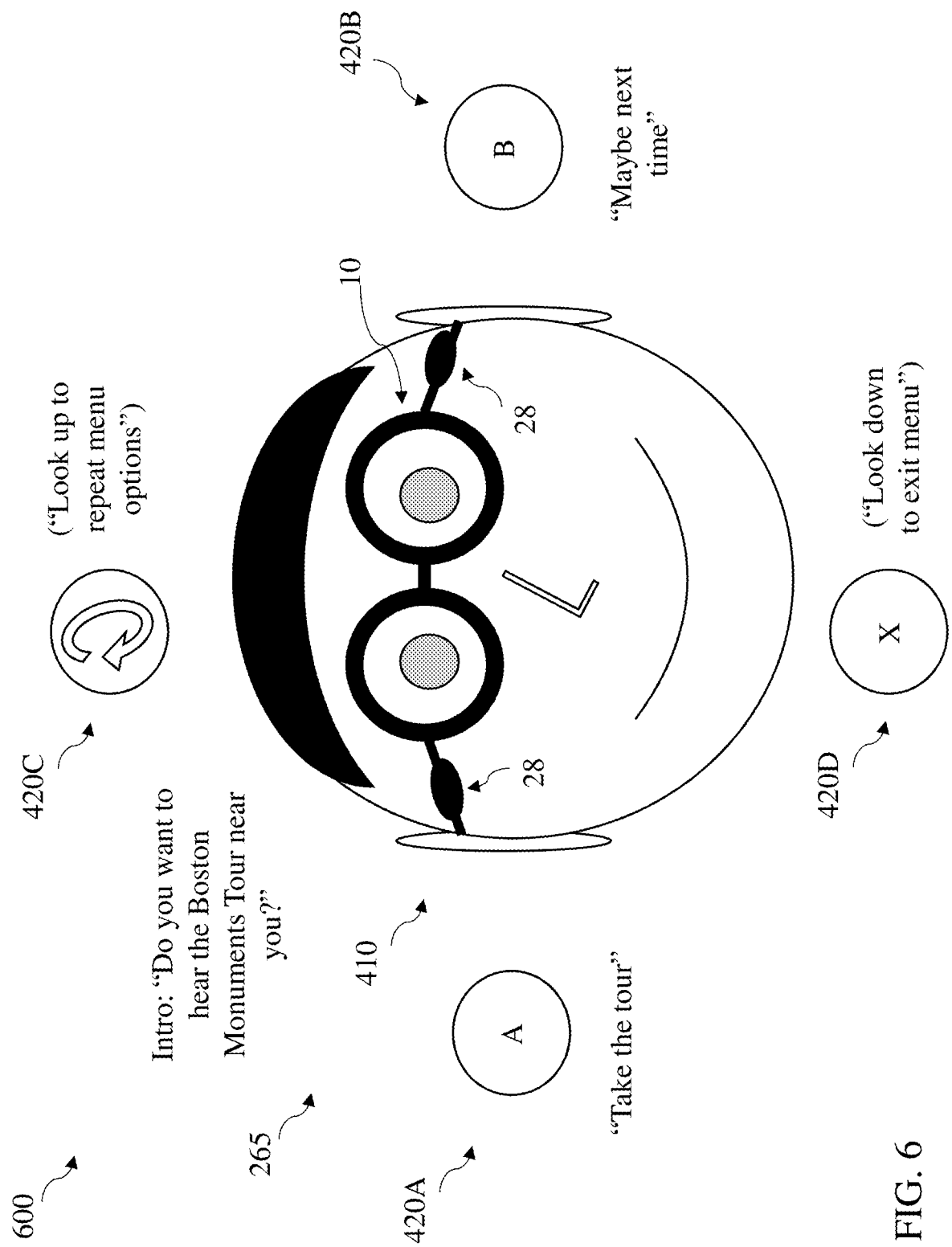
FIG. 6 shows an additional example environment according to various implementations.
Figure 7:
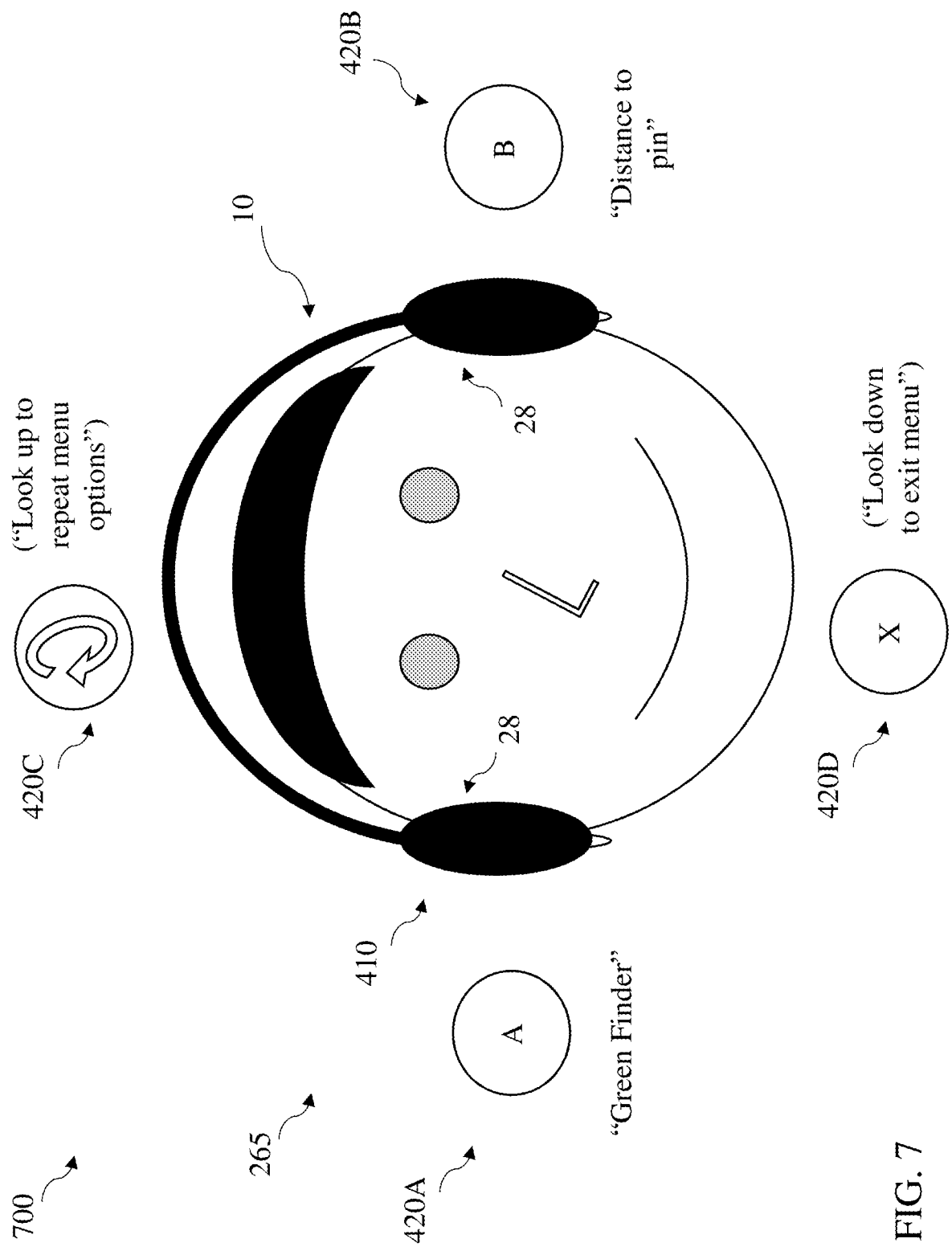
FIG. 7 shows another example environment according to various implementations.
Figure 8:
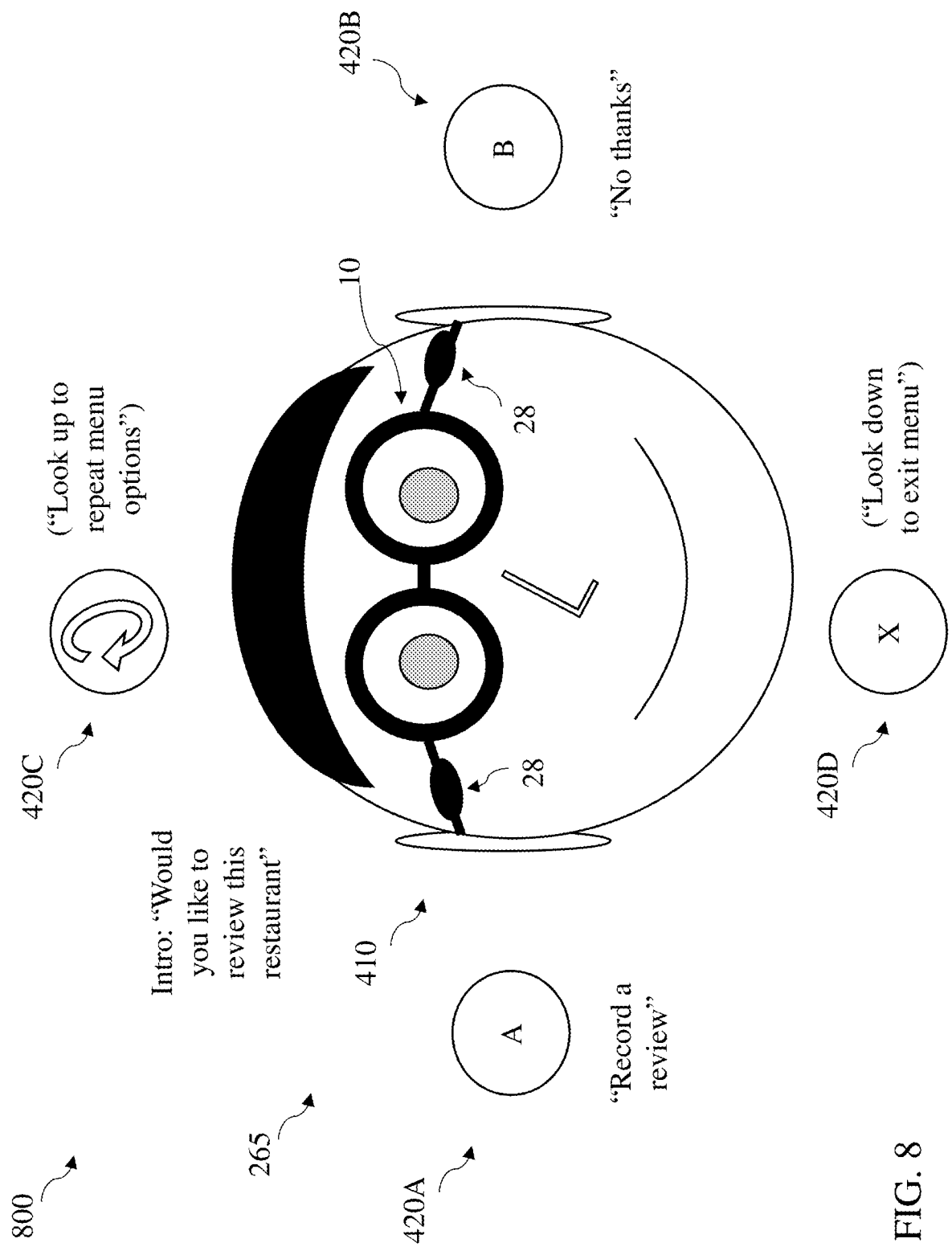
FIG. 8 shows an additional example environment according to various implementations.

FIG. 4 shows an example environment 400, illustrating a user 410 wearing an audio device 10 (e.g., audio eyeglasses), and a depiction of a spatialized AR menu (or menu) 265. As noted herein, the AR audio engine 240 is configured to provide at least two distinct audio choices corresponding with spatially delineated zones 420 in the menu 265. The zones 420 are defined relative to the physical position of the audio device 10, e.g., relative to the look direction of user 410 while wearing the audio device 10. Each audio choice/option is associated with a selection from the menu 265, e.g., a zone 420 in the menu 265. In particular implementations, the menu 265 includes at least two audio choices (or, options) in distinct zones 420, and in more particular implementations, can include three, four or more spatially delineated zones 420. The example depicted in FIG. 4 shows four spatially delineated zones 420.

In various implementations, the audio choices (or menu options) are associated with selection commands for taking actions at the audio device 10 (or other device such as audio gateway 210 and/or smart device 280) and/or via the application(s) 260 (FIG. 2). For example, the audio choices presented in each spatially delineated zone 420 correspond with a device-based action or an application-based action. In some cases, the AR audio engine 240 is configured to store or otherwise access correlations between selection commands and menu options rendered in spatially delineated zones 420, e.g., in a relational database, lookup table or other data structure. In various implementations, the choices (or, options) are rendered in a menu as an audio file or audio stream. In particular cases, each menu 265 includes an assigned audio file or stream for playback in one or more spatially delineated zones 420 based upon the detected physical positon of the audio device 10. In various implementations, the menu 265 is developed in a similar manner as spatialized audio pins or scenes in an AR audio environment, e.g., as described in U.S. patent application Ser. No. 16/539,480 ("Augmented Audio Development Tool", filed on Aug. 13, 2019), which is incorporated by reference in its entirety.

In certain cases, selection of an audio choice (described further herein) causes the AR audio engine 240 to perform one of a plurality of actions. In certain cases, the choices correspond with the type of action associated with their selection. For example, choices can include audio playback of instructions for adjusting a setting at the audio device 10 (e.g., adjusting volume of playback or noise cancelling level), instructions for entering an additional audio menu (e.g., selecting option 2 to hear sub-options 2A, 2B, 2C, etc.), instructions for initiating playback of audio content associated with the selected audio choice (e.g., selecting playback of a complete song from the choice that presents a sample of the song, or selecting playback of navigation instructions from the choice that presents an introduction to a walking tour), and/or instructions for exiting the menu (e.g., playback of an audio file describing a gesture for exiting the menu mode).

In additional implementations, each audio choice provided to the user can be associated with audio content from one or more applications 260. In some implementations, the menu choices can include playback of an audio file or stream, such as a file or stream associated with a selection command. In cases where the selection command relates to audio playback (e.g., playback of an audio file or stream), the menu choice can include audio playback of a representative segment of audio content (e.g., the chorus of a song, the introduction to an audio book, a highlight from a sporting broadcast, a description of the audio content, an audio message, a description of an audio pin, an indicator of the presence of an audio pin, an audio beacon, a source of an audio message, or any other portion of the audio content). In various additional implementations, the playback of the menu choice is the entire audio content (e.g., audio file), such as in the case of a message, audio cue, audio beacon, audio pin, request for feedback, etc. In some cases, menu settings can be saved in user profile(s) 275, or default menu settings can be utilized to determine which portion(s) of audio content play as choices.

In additional cases, a content provider (e.g., the party responsible for an application 260) supplies location-dependent choices, context-dependent choices, a text-to-speech set of choices for navigating a directory structure, or a mono and/or band-limited copy of content streams for playback as menu choices. In certain cases, where the choice is only a portion of the audio content, a looped representative sample can be provided as the playback of the choice to enhance the likelihood that the user 410 recognizes the audio content, or louder portions of the audio content can be provided as the choice(s) to improve audibility.

With continuing reference to FIG. 4, the menu 265 is merely a visual representation of each of the zones 420 (illustrated as distinct zones denoted by A, B, C, D, etc.) in which the choice (e.g., audio sample, or audio playback of a piece of information) will play for the user 410. For example, upon initiating the spatialized AR menu mode, the AR audio engine 240 provides distinct audio choices (options) to the user 410 (e.g., at the audio device 10) for selection. In some particular implementations, initiating the spatialized AR menu mode includes outputting introductory audio content (e.g., at audio device 10) about at least one of the spatially delineated zones 420 in the menu 265, outputting a signature tone associated with the menu 265, or outputting a signature tone indicating that the menu 265 is available or indicating an entity associated with the menu 265. For example, an entity that creates, owns or otherwise manages an application 260 can assign a signature tone or other sound to indicate association with the menu 265 (e.g., a multi-chime introduction, or a brief jingle). In certain cases, the introductory audio content is output as spatialized audio in a direction in which the user 410 must turn to select one of the audio choices/options.

In a particular example, the AR audio engine 240 initiates the spatialized AR menu mode by playing introductory audio content at the audio device 10 (e.g., in stereo audio), such as: "Welcome to Bose Menu (Mode)." Following the introductory audio content, the AR audio engine 240 initiates spatialized playback of the choices in the menu 265 in different zones 420, e.g., playing back an audio choice (option) associated with zones 420A and 420B: "Look right to take action A" (played in spatialized manner as originating from the user's right direction), followed by, "Look left to take action B" (played in spatialized manner as originating from the user's left direction). In particular cases, the AR audio engine 240 initiates spatialized playback of menu options sequentially, e.g., starting with playback associated with zones to the user's right (420A), left (420B), upward direction (420C) or downward direction (420D), and progressing left, right, up, down, etc. In certain examples, the menu 265 includes default selections in one or more positions relative to the user's look direction. In these cases, one or more zones 420A, 420B, 420C, 420D, etc. can be dedicated to a default selection for a particular menu 265, or in particular cases, the zone(s) can be dedicated to a default selection for a set of menus 265 (e.g., two or more menus). In these cases, the AR audio engine 240 can provide a familiar set of menu options in the default selection zones, for example, where the zone 420C in the upward direction provides a repeat selection for repeating playback of the audio choices, and where the zone 420D in the downward direction provides an exit selection for exiting the spatialized AR menu mode (e.g., exiting the menu 265).

In the example illustrated in FIG. 4, the menu 265 includes four spatially delineated zones 420, including a pair of horizontally aligned zones 420A and 420B that each correspond with at least two distinct audio choices. The pair of horizontally aligned zones 420A, 420B are aligned with left and right movement, respectively, relative to a neutral orientation of the wearable audio device 10. In various implementations, the neutral orientation corresponds with the orientation of the user's look direction when the spatialized AR audio mode is initiated, i.e., the look direction of the user 410 when the initiation trigger is detected or when the introductory menu audio is played. In other implementations, the neutral orientation corresponds with the approximately forward-facing orientation of the user's head, e.g., as detected by one of the sensors (e.g., IMU) in the sensor system 36. The menu 265 can also include a pair of vertically aligned zones 420C, 420D that are aligned with up and down movement relative to the neutral orientation of the audio device 10. In some cases, as noted herein, the vertically aligned zones 420C, 420D can correspond with default menu selections (e.g., repeat playback selection and exit menu selection). In certain implementations, neighboring spatially delineated zones are separated from one another by approximately at least 20 degrees of rotation laterally (e.g., 420A and 420B), or approximately at least 15 degrees vertically (e.g., 420C and 420D). In some cases, the span of the zones 420 in the menu 265 can be further limited by a desired number of zone selections, based upon preferences of the user 410 or default settings. For example, each zone 420 can span a certain number of degrees across a user's field of motion, so as to clearly present distinct audio options to the user 410. While the user 310 may be comfortably capable of up to 150 degrees of motion in a particular direction (e.g., head rotation), the user experience may be enhanced with a smaller range of motion, e.g., 50-60 degrees. Additionally, while any number of audio choices (options), corresponding with zones 420, could be presented across this range of motion, the range of each zone 420 can be set to a degree measurement providing for sufficient sampling as the user 410 moves between zones 420, e.g., 10-15 degrees per zone 420. In particular examples, the user 410 is presented with approximately 2-4 zones 420 horizontally and/or vertically, spanning approximately 45-75 degrees (with each zone 420 spanning approximately 10-15 degrees). In more particular cases, the user 410 is presented with only two horizontally or vertically aligned zones 420, such as an "A" or "B" option or "Yes" or "No" option. In any case, the menu 265 can include default or menu-neutral options in additional zones (e.g., zones 420C, 420D), such as the Repeat and Exit options.

Returning to FIG. 3, after initiating the spatialized AR menu mode, the AR audio engine 240 is configured to receive a selection command indicating selection of one of the audio choices (process 330). In various implementations, the selection command includes one or more of: a tactile actuation, gesture actuation or a voice command that is detected at the audio device 10 or another device (e.g., audio gateway 210 and/or smart device 280). In some cases, the selection command is a gesture that is detected by the gesture detection system (e.g., an IMU at the audio device 10). As noted herein, example gestures can include singleaction gestures (e.g., nod, double-tap, head shake, look left/right, look up/down etc.) or multi-modal gestures (e.g., those requiring two actions to register a selection, such as a look-and-hold gesture, a hold-and-nod gesture, a look-and-tap gesture, etc.). In various implementations, the AR audio engine 240 is configured to only register a selection command that is made by a multi-modal gesture. In certain cases, the multi-modal gesture(s) can mitigate false positive selections, such as in the case where a user looks in a direction for a reason unrelated to a menu selection, or brushes/taps the audio device 10 inadvertently. Further details of multi-modal gestures and detection of such gestures is described in U.S. patent application Ser. No. 16/295,517 ("Systems and Methods for Controlling Electronic Devices"), previously incorporated by reference herein.

It is further understood that in any circumstance where gestures are described as triggering action by the AR audio engine 240, multi-modal gestures can be required in order to trigger such action. For example, multi-modal gestures can be required in order to initiate the spatialized AR menu mode. In these cases, as with the requirement of multi-modal gestures to select from options within a menu 265, the multi-modal gesture selection requirement can mitigate false positive selections/menu options. This requirement can allow the user 410 to remain engaged in other audio device functions, e.g., using gestures, voice commands, etc., without accidentally initiating the spatialized AR menu mode, or accidentally selecting options from a menu 265 in that menu mode.

With continuing reference to FIG. 3, in response to receiving the selection command, the AR audio engine 240 is configured to take one of a set of actions (process 340). In some cases, the AR audio engine 240 is configured to perform one of the following in response to receiving the selection command: a) initiate playback of audio content associated with the selected audio choice, b) adjust a setting at the wearable audio device, c) enter an additional menu related to the selection command, or d) exit the menu.

In cases where the user 410 selects an audio choice/option, the AR audio engine 240 is configured to initiate (e.g., begin or otherwise continue) playback of audio content associated with that choice/option. Examples of these scenarios can include user selection of an audio playlist, podcast, audio book, etc., and subsequent playback of songs in the playlist, the introduction to a podcast, or the continuation of an audio book from a last stopping point.

In cases where the user 410 selects to adjust a setting at the audio device 10, the selection command can initiate one or more operating modes (e.g., noise control or noise canceling), or adjust settings in a current operating mode (e.g., increase playback volume). In various implementations, the audio device setting(s) that are adjustable via the menu(s) 265 include a volume of audio playback or a noise canceling or noise reduction setting at the audio device 10. By selecting one or more zones 420 from the menu 265, the user 410 can adjust settings (e.g., "look right, touch and nod to initiate noise canceling", "look left and tap to initiate focused listening mode", or "look right and nod to increase playback volume").

In cases where the user 410 selects to enter an additional menu 265 related to the selection command, the menu 265 can provide device information about the audio device 10 including at least one of: a battery level of the audio device 10, product information about the audio device 10 (e.g., model number, storage capability, connection speed, etc.), or other operating modes for the wearable audio device (e.g., focused listening mode, noise canceling mode, ambient acoustic awareness mode, etc.). The additional menu 265 can also provide content selection options for the audio playback (e.g., distinct songs from a selected playlist or selected artist assigned to zones 420 in a sub-menu, or audio books from a selected genre assigned to zones 420 in a sub-menu), or purchasing selection options from an external commerce application (e.g., distinct products within a category assigned to zones 420 in a sub-menu).

As noted herein, the user 410 can exit the menu 265 by taking an exit action (e.g., looking down (zone 420D) and holding, looking down and taking an additional gesture-based action such as tapping, nodding, shaking the head, etc.), or the menu 265 can automatically close after a timeout period. After the user 410 actively exits the menu 265, or the menu times out, the gesture-based commands associated with that menu 265 will no longer be registered. That is, the menu 265 must be re-initiated to enable gesture-based functions from that menu 265.

FIGS. 5-8 illustrate additional example environments 500, 600, 700 and 800 according to various implementations. These environments 500, 600, 700 and 800 aid in illustrating example menus and user interactions according to various implementations.

Environment 500 illustrates a user 410 wearing an audio device 10 and the audio menu 265 rendered in spatially delineated zones 420 based upon the user's position. In this example, the user 410 initiates the spatialized AR mode, e.g., by a command detected at an interface on the audio device 10 or another connected device (e.g., audio gateway 210 and/or smart device 280). For example, the user 410 can initiate the spatialized AR mode with a touch command (e.g. tap, double-tap, tap and hold) at an interface such as a capacitive touch interface on the audio device 10. In this case, in response to the user initiation command, the AR audio engine 240 is configured to provide audio choices relating to one or more applications in zones 420A and 420B. In this particular case, e.g., where the user 410 initiates the AR menu mode, the AR audio engine 240 does not provide an audio intro to the AR menu mode. In this example, the AR audio engine 240 renders playback associated with audio choices in zones 420A and 420B, which can be related to distinct applications 265 running at any device (e.g., audio device 10, audio gateway 210 and/or smart device 280). In the particular example shown, the AR audio engine 240 renders playback associated with a calendar application in zone 420A and renders playback associated with a weather application in zone 420B. For example, the AR audio engine 240 renders playback in zone 420A (to the user's right) including: "Look right to hear next meeting details", and renders playback in zone 420B (to the user's left) including: "Look left to hear today's weather forecast." It is understood that playback choices requesting the user 410 to "look left" or "look right" can be replaced by generic playback such as "look here" or "look over here" because the playback of these choices is spatialized. Additionally, as noted herein, the playback can include additional details for multi-modal gesture selection, e.g., in addition to a look direction. That is, the playback from choice A or B can include instructions such as "Look left and tap to hear . . . " or "Look right and nod to hear . . . " In certain implementations, options in zones 420C and 420D (e.g., repeat, exit, etc.) are not played as spatialized audio. For example, where the user 410 initiates the spatialized AR menu, these options can remain selectable without playing an audio introduction about how the choice can be actuated.

Environment 600 illustrates an example where the application 260 initiates the spatialized AR menu 265 (via AR audio engine 240), e.g., in response to an initiation trigger such as a location-based trigger (e.g., GPS-based, proximity based, audio-pin based, etc.). In these cases, the AR audio engine 240 plays an introduction to the spatialized AR menu 265, including a question or other request for feedback. In this particular example, the AR audio engine 240 outputs audio requesting a user response, e.g., "Do you want to hear the Boston Monuments Tour near you?" Options associated with zones 420A and 420B provide affirmative and negative responses, respectively (e.g., "Take the tour" and "Maybe next time"). In some cases, the options are played back in a spatialized manner while the user 410 remains in a neutral orientation (e.g., looking generally ahead), such that playback of the options in the zones 420A, 420B entices the user 410 to look in those directions. Playback of the options can include additional directional indicators (e.g., "Look left to select . . . " or "Look right to select . . . "), but in various implementations, playback of the options is rendered without directional indicators. As indicated in parentheses, default options such as repeat and exit can be actively played back in some cases, and in others, can be omitted from the menu playback 265.

Environment 700 shows an example where the application 260 initiates the spatialized AR menu 265 (via AR audio engine 240) in response to a user command, e.g., by a command detected at an interface on the audio device 10 or another connected device (e.g., audio gateway 210 and/or smart device 280). In this example, the AR menu 265 is provided by an application 260, e.g., a third party such as an entity not associated with the AR audio engine 240. In some cases, the AR menu 265 is associated with an event-based or activity-based application such as a sporting application. In these cases, the user 410 can initiate the AR menu 265 while at a particular event (e.g., a concert or other entertainment event) or while participating in a particular activity (e.g., hiking or playing a sport). One such example can include a golf assistance application 260 that is configured to provide information about a golf course on which the user 410 is playing. In certain cases, the AR audio engine 240 detects the user's location (using any approach noted herein), and enables command functions for triggering the menu 265 associated with the golf assistance application 260. In some cases, as noted herein, the user 410 can initiate the spatialized AR mode with an interface command, e.g., a touch command (e.g. tap, double-tap, tap and hold) at an interface such as a capacitive touch interface on the audio device 10. In this case, in response to the user initiation command (and in some cases, contingent upon detecting the user's location corresponds with a golf course that is mapped by the golf assistance application 260), the AR audio engine 240 is configured to provide audio choices relating to the golf assistance in zones 420A and 420B. In this particular case, e.g., where the user 410 initiates the AR menu mode, the AR audio engine 240 does not provide an audio intro to the AR menu mode. In this example, the AR audio engine 240 renders playback associated with audio choices in zones 420A and 420B, which relate to additional audio playback from the golf assistance application 260. For example, zone 420A enables "Green Finder", which when actuated (e.g., by multi-modal gesture) plays audio describing aspects of the putting green on the hole which the user 410 is playing (e.g., as detected by location data). Zone 420B enables "Distance to pin" playback, which when actuated, plays audio describing the user's current distance to the pin (e.g., "You are 170 yards to the pin on hole 9"). As indicated in parentheses, default options such as repeat and exit can be actively played back in some cases, and in others, can be omitted from the menu playback 265.

Environment 800 shows an example where the application 260 initiates the spatialized AR menu 265 (via AR audio engine 240) in response to detecting a contextual trigger, e.g., a location-based trigger such as proximity to a point of interest, or activity from another application 260 running at the audio device 10, audio gateway 210 and/or smart device 280. In this example, the AR menu 265 is provided by an application 260, e.g., a third party such as an entity not associated with the AR audio engine 240. In some cases, the AR menu 265 is associated with a dining application such as a restaurant rating application. In this example, in response to detecting a contextual trigger such as the user's location at the restaurant for an extended period, detected entry and exit from the restaurant, or activity on a payment application at the restaurant, the dining application initiates the spatialized AR menu 265, including choices as playback in zones 420A and 420B, respectively. In these cases, the AR audio engine 240 plays an introduction to the spatialized AR menu 265, including a question or other request for feedback. In this particular example, the AR audio engine 240 outputs audio requesting a user response, e.g., "Would you like to review this restaurant?" Options associated with zones 420A and 420B provide affirmative and negative responses, respectively (e.g., "Record a review", which can be followed with a tone or prompt to record an audio review and "No thanks"). In some cases, the options are played back in a spatialized manner while the user 410 remains in a neutral orientation (e.g., looking generally ahead), such that playback of the options in the zones 420A, 420B entices the user 410 to look in those directions. Playback of the options can include additional directional indicators (e.g., "Look left to select . . . " or "Look right to select . . . "), but in various implementations, playback of the options is rendered without directional indicators. As indicated in parentheses, default options such as repeat and exit can be actively played back in some cases, and in others, can be omitted from the menu playback 265.

Additional AR Audio Functions

In some particular cases, upon initiating the spatialized AR menu mode, the AR audio engine 240 provides an introductory audio sample that defines the selection options for each of the spatially delineated zones 420 (e.g., including or excluding default selection options), and in response to detecting the change in the physical position of the audio device 10 (e.g., as detected by the IMU or other sensor in sensor system 36) to a position associated with one of the zones (e.g., 420A), plays one of the audio choices at the audio device 10. In these cases, the introductory menu can include information about the audio playback in each of the spatially delineated zones 420, but detected change in the user's look direction will also trigger additional audio playback about the selection option associated with that zone. In one example, the introductory menu includes information about the audio playback in each of the spatially delineated zones, e.g., "Welcome to the Bose Content Selection Menu. Look right to hear a sample of a live broadcast of the Red Sox Radio from Fenway Park. Look left to shuffle through songs on your Saturday Morning playlist." After detecting that the user 410 looks right, the AR audio engine 240 can initiate playback (e.g., an audio stream) of the live broadcast of a Red Sox baseball game, or a sample of the broadcast such as a highlight of a recent home run (e.g., "David Price strikes him out to retire the side!"), followed by a prompt to select this playback as the primary playback at the audio device 10 (e.g., "Nod to select this audio stream" or "Tap and nod to select this game feed"). Alternatively, or additionally, after detecting that the user 410 looks left, the AR audio engine 240 can initiate playback of audio clips from one or more songs on a predefined playlist, audio stream or radio station (e.g., " . . . love that dirty water . . . ", " . . . shipping up to Boston . . . "), followed by a prompt to select this playlist or radio station (e.g., "say Yes to select this playlist" or "grab and nod to select this channel").

Figure 9:
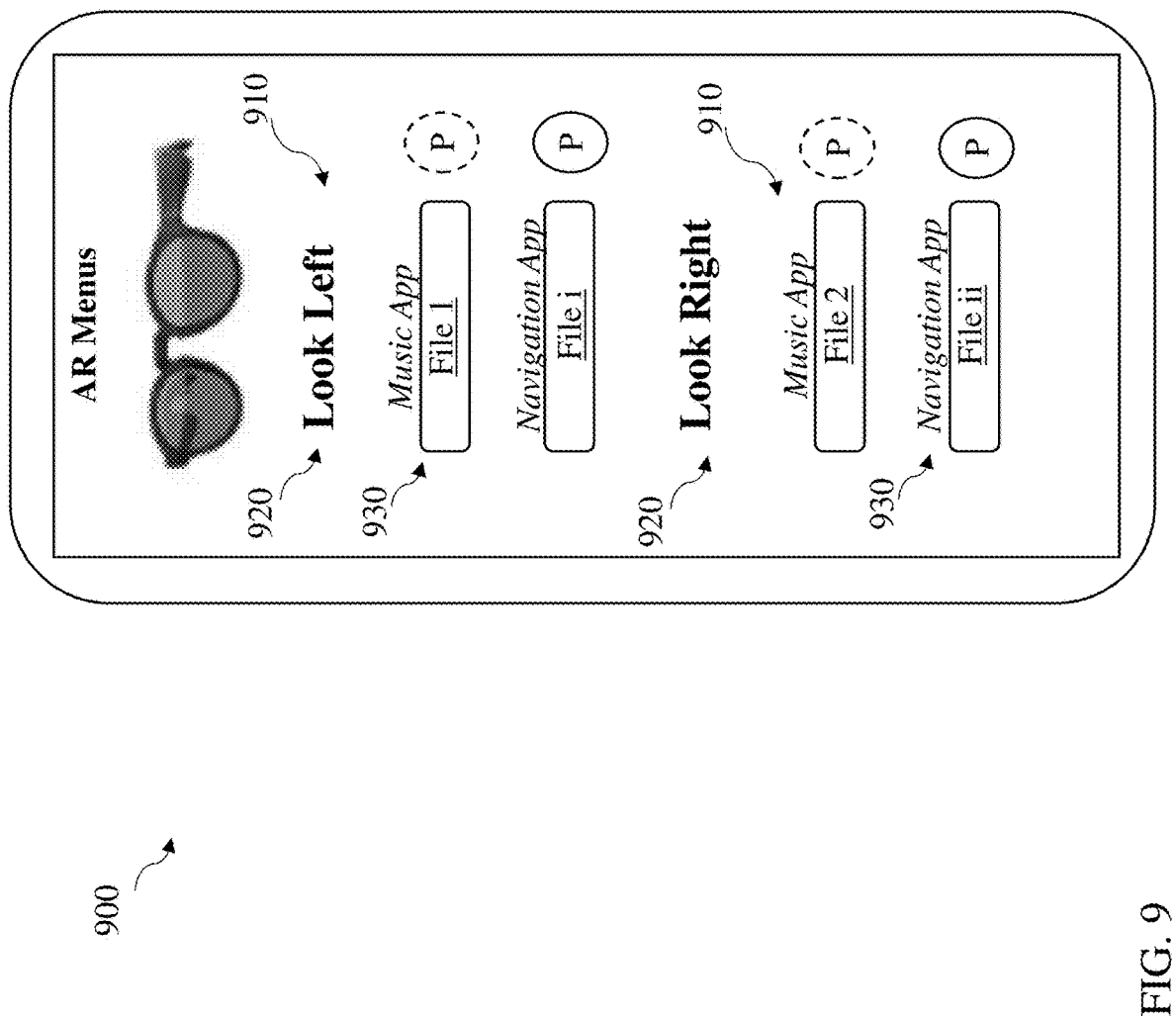
FIG. 9 shows an interface permitting a user or a programmer to assign menu options to distinct zones in a spatialized AR menu according to various implementations.

In additional implementations, as depicted in FIG. 9, the AR audio engine 240 provides an interface 900 permitting the user or a programmer to assign menu options to distinct zones 420 (FIGS. 4-8), e.g., in a spatialized AR menu. In certain cases, the interface 900 includes a user interface allowing the user 410 to assign preferences to menus 265 rendered at the audio device 10. In some additional cases, the interface 900 includes an application programming interface (API) that includes a set of inputs 910. The inputs 910 can be rendered by an API calling component to render the menu 265 (FIG. 4). For example, the interface inputs 910 can include a directional assignment option (e.g., Look Left, Look Right) 920, and at least one application-specific assignment option 930 (e.g., App A, option/file (1), option/file (2); App B, option/file (i), option/file (ii)). These options 920, 930 permit insertion of at least two distinct audio choices as audio files into pre-defined entries assigned to the zones 420 in the menu 265, as illustrated in FIGS. 4-8.

Additional direction assignment options are also possible within the interface 900, for example, the interface inputs 910 enable a user/programmer to assign audio device settings to menu selections (e.g., Look Left, Look Right). Example device settings can include noise control/cancelation settings, as well as audio modes. In particular examples, audio modes combine both noise control/cancelation settings and audio content playback. One example audio mode is an "Office Mode" that sets noise cancelling to a high level and initiates a "focus" playlist of music from a music service provider. Additional audio modes (e.g., "Sleep Mode", with high noise canceling and white noise playback) can be assigned to one or more menu selection options in zones 420 (FIGS. 4-8).

Further, the interface 900 enable a user/programmer to assign priority levels to incoming notifications (e.g., from applications 260, FIG. 2) and user-centered device functions (e.g., phone calls, music playback, navigation instructions). For example, inputs 910 can include priority buttons (P) or other indicators for indicating a relative priority between notifications from distinct applications 260, or between those notifications and other device functions (e.g., phone call audio, or email text-to-voice playback).

In additional implementations, the AR audio engine 240 enables third parties, such as those associated with applications 260 (FIG. 2) to define default choices/options in menus 265. That is, in various implementations, the AR audio engine 240 allows an application developer or manager to define which choices are assigned to zones 420 in a menu 265 (e.g., FIGS. 4-8). In these implementations, the AR audio engine 240 receives a request from an application 260 to manage AR audio functions, including, AR audio menu functions. In some optional implementations, the AR audio engine 240 verifies the request (e.g., according to any known verification approach). In other cases, the application 260 is a known entity and is able to access menu control options without a specific verification request. In any case, the AR audio engine 240 can enable the application 260 to define which audio content is presented in each of the zones 420 associated with one or more choices in the menu 265. The AR audio engine 240 is then configured to render the audio content as defined by the choices, in response to detecting one or more initiation triggers, and subsequently, selection command(s).

In certain cases, the AR audio engine 240 provides the structure of the menu 265 in spatialized form, but enables the application 260 to define the content that is presented in the menu 265. In these cases, the layout of the zones 420 and/or the number of zones 420 in a menu 265 is predefined by the AR audio engine 240, and the application 260 (e.g., application developer) is provided with selection options for assigning playback (choices) to each of those zones 420. In these cases, the AR audio engine 240 can provide an interface of assignable options (e.g., via an API) that allows the application 260 to assign one or more audio files/streams to zones 420 in a menu 265 for rendering at the audio device 10.

In other implementations, the AR Audio engine 240 temporarily gives control of the menu options and the playback of the menu 265 at the audio device 10 to the third party application 260. In these cases, the application 260 can define the number of zones 420 in the menu 265, the layout of zones 420, introductory audio content (e.g., a chime or tone) and/or the triggering mechanism for entering the spatialized AR audio menu 265. In still further implementations, the AR audio engine 240 allows the application 260 to control some assignable features in the menu 265 (e.g., introductory audio content) while restricting control of others (e.g., number of zones 420). Additional aspects of enabling third party control of AR functions is described in U.S. patent application Ser. No. 16/370,029 ("Methods and Systems for Establishing User Controls"), previously incorporated by reference herein.

In some example cases, the AR audio engine 240 is configured to manage multiple audio streams both for incoming notifications and user-initiated interactions. This process can include mixing/pausing a primary audio stream relative to a secondary audio stream to ensure delivery of menu options and notifications according to priority. The mixing/pausing approach can vary depending on the types of audio playback in the menu, for example, for playback of TTS audio streams, the AR audio engine 240 can pause the primary stream while a secondary audio stream is played, whereas playback of tones and/or prompts may simply duck the primary stream.

In some implementations, the AR audio engine 240 prioritizes notifications and menus according to detected activity state data, such as data about one or more of: a location of the audio device 10 (e.g., geographic location provided by a GPS sensor or elevation provided by a geolocation system or network triangulation location), an orientation of the audio device 10 (e.g., as detected by an IMU or an optical sensor), a relative proximity of the audio device 10 to another audio device (e.g., using GPS sensor(s), network connectivity range such as Bluetooth range or other P2P range systems, optical sensors, or acoustic sensors detecting the voice of the other audio device's user), an indicator about the environment proximate the audio device 10 (e.g., weather conditions as detected by a humidity sensor or air quality as detected by an air quality sensor), detected motion of the audio device 10 (e.g., detecting that a user is running using the IMU, or that the user is driving a vehicle using GPS information, or that the user is approaching an obstacle using optical sensors, etc.), or a task list for the user of the audio device 10 (e.g., as provided by application execution data, such as a workplace management application, fitness application or collaborative task management application).

Additional details and examples related to the user experience in the augmented audio environment are described in the following patent applications, each of which is herein incorporated by reference in its entirety: U.S. patent application Ser. No. 16/267,643 ("Location-Based Personal Audio"); U.S. patent application Ser. No. 16/179,205 ("Spatialized Virtual Personal Assistant"); U.S. patent application Ser. No. 16/289,932 ("Augmented Audio Development"); and U.S. patent application Ser. No. 16/289,940 ("Augmented Reality Audio Playback Control").

As described herein, the AR audio engine 240 can have the technical effect of controlling spatialized AR audio menus, enabling gesture-based selection of options from those menus. The various implementations described herein allow users to engage a plurality of device functions and external application functions without viewing a visual interface, e.g., without needing to look at a device screen. The menus described herein can be presented in a purely audio form, that is, as audio playback at transducers on an audio device 10. These menus 265 allow the user to receive information, perform tasks and make commands with his/her hands free and head up. That is, the user can be more aware of his/her surroundings as compared with conventional menu selection protocols that rely upon managing notifications on a visual display or screen. The AR audio engine 240 can significantly enhance the user experience when compared with these conventional menu selection protocols.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A computer-implemented method of controlling a wearable audio device, the method comprising:
   detecting an initiation trigger for initiating a spatialized augmented reality (AR) menu mode;
   providing at least two distinct audio choices corresponding with spatially delineated zones in a menu defined relative to a physical position of the wearable audio device, in response to the initiation trigger, wherein each audio choice is associated with a selection from the menu,
   wherein the menu comprises four spatially delineated zones, wherein the four spatially delineated zones comprise:
   a pair of horizontally aligned zones, each corresponding with the at least two distinct audio choices, wherein the pair of horizontally aligned zones are aligned with left and right movement, respectively, relative to a neutral orientation of the wearable audio device; and
   a pair of vertically aligned zones, each corresponding with default menu selections, wherein the pair of vertically aligned zones are aligned with up and down movement, respectively, relative to the neutral orientation of the wearable audio device,
   wherein the default menu selections are common to a plurality of menus regardless of an entity associated with each of the plurality of menus;
   receiving a selection command indicating selection of one of the audio choices, wherein the selection command comprises a gesture detected by a gesture detection system at the wearable audio device; and
   in response to receiving the selection command: a) initiating playback of audio content associated with the selected audio choice, b) adjusting a setting at the wearable audio device, c) entering an additional menu related to the selection command, or d) exiting the menu.

2. The computer-implemented method of claim 1, further comprising providing a prompt to initiate the spatialized AR menu mode, wherein the initiation trigger comprises an affirmative response to the prompt, wherein the initiation trigger comprises a user interface command, a multi-modal gesture, a sensor input, or detected activity by a mobile application running on the wearable audio device.

3. The computer-implemented method of claim 1, wherein the default menu selections comprise:
   an exit selection for exiting the spatialized augmented reality (AR) menu mode; and
   a repeat selection for repeating playback of the at least two audio choices.

4. The computer-implemented method of claim 1, wherein the gesture detection system comprises an inertial measurement unit (IMU) at the wearable audio device.

5. The computer-implemented method of claim 1, wherein the gesture comprises a multi-modal gesture, wherein the selection command is only detected in response to detecting the multi-modal gesture, wherein the multi-modal gesture mitigates false positive selections.

6. The computer-implemented method of claim 1, wherein initiating the spatialized AR menu mode comprises at least one of:

outputting introductory audio content about at least one of the spatially delineated zones in the menu, outputting a signature tone associated with the menu, or outputting a signature tone indicating an entity associated with the menu.

7. The computer-implemented method of claim 6, wherein the introductory audio content is output as spatialized audio in a direction in which a user of the wearable audio device must turn to select one of the audio choices.

8. The computer-implemented method of claim 1, wherein the menu is rendered by an application programming interface (API) calling component from a set of inputs to an API interface, wherein the API interface permits insertion of the at least two distinct audio choices as audio files into pre-defined entries assigned to the spatially delineated zones.

9. The computer-implemented method of claim 1, wherein the setting comprises at least one of: a volume of audio playback at the wearable audio device, a noise canceling or noise reduction setting at the wearable audio device; and wherein the additional menu provides:
  one of: device information about the wearable audio device, the device information comprising at least one of: a battery level of the wearable audio device, product information about the wearable audio device, or other operating modes for the wearable audio device.

10. The computer-implemented method of claim 1, wherein neighboring spatially delineated zones are separated from one another by approximately at least 20 degrees of rotation laterally or approximately at least 15 degrees vertically.

11. The computer-implemented method of claim 1, wherein a user of the wearable audio device, upon initiating the spatialized AR menu mode, is provided with an introductory audio choice defining selection options for each of the spatially delineated zones in the menu defined relative to the physical position of the wearable audio device, and in response to a change in the physical position of the wearable audio device to a physical position associated with one of the spatially delineated zones, one of the at least two distinct audio choices is provided at the wearable audio device.

12. The computer-implemented method of claim 1, wherein initiating the spatialized AR menu mode comprises at least one of:
  outputting a signature tone associated with the menu, or
  outputting a signature tone indicating an entity associated with the menu.

13. The computer-implemented method of claim 1, wherein the menu is associated with a first application, and while the spatialized AR menu mode is active, the method further includes:
  running at least one additional application not associated with the menu in a background state;
  queuing at least one additional menu from the at least one additional application; and
  in response to a distinct initiation trigger, providing at least two distinct audio choices corresponding with spatially delineated zones in the at least one additional menu defined relative to a physical position of the wearable audio device.

14. The computer-implemented method of claim 1, wherein each of the at least two distinct audio choices is output in a band-limited playback format comprising playback of monaural sources.

15. The computer-implemented method of claim 1, wherein the setting comprises at least one of: a volume of audio playback at the wearable audio device, a noise canceling or noise reduction setting at the wearable audio device; and wherein the additional menu provides one of: content selection options for the audio playback, or purchasing selection options from an external commerce application.

16. A wearable audio device comprising:
  an acoustic transducer having a sound-radiating surface for providing an audio output;
  a gesture detection system; and
  a controller coupled with the acoustic transducer and the gesture detection system, the controller configured to:
  detect an initiation trigger for initiating a spatialized augmented reality (AR) menu mode;
  provide at least two distinct audio choices corresponding with spatially delineated zones in a menu defined relative to a physical position of the wearable audio device, in response to the initiation trigger, wherein each audio choice is associated with a selection from the menu,
  wherein the menu comprises four spatially delineated zones, wherein the four spatially delineated zones comprise:
    a pair of horizontally aligned zones, each corresponding with the at least two distinct audio choices, wherein the pair of horizontally aligned zones are aligned with left and right movement, respectively, relative to a neutral orientation of the wearable audio device; and
    a pair of vertically aligned zones, each corresponding with default menu selections, wherein the pair of vertically aligned zones are aligned with up and down movement, respectively, relative to the neutral orientation of the wearable audio device,
  wherein the default menu selections are common to a plurality of menus regardless of an entity associated with each of the plurality of menus;
  receive a selection command indicating selection of one of the audio choices, wherein the selection command comprises a gesture detected by the gesture detection system; and
  in response to receiving the selection command: a) initiate playback of audio content associated with the selected audio choice, b) adjust a setting at the wearable audio device, c) enter an additional menu related to the selection command, or d) exit the menu.

17. The wearable audio device of claim 16, wherein initiating the spatialized AR menu mode comprises at least one of:
  outputting a signature tone associated with the menu, or
  outputting a signature tone indicating an entity associated with the menu.

18. The wearable audio device of claim 16, wherein a user of the wearable audio device, upon initiating the spatialized AR menu mode, is provided with an introductory audio choice defining selection options for each of the spatially delineated zones in the menu defined relative to the physical position of the wearable audio device, and in response to a change in the physical position of the wearable audio device to a physical position associated with one of the spatially delineated zones, one of the at least two distinct audio choices is provided at the wearable audio device.

19. A computer-implemented method of controlling a wearable audio device, the method comprising:

detecting an initiation trigger for initiating a spatialized augmented reality (AR) menu mode;

providing at least two distinct audio choices corresponding with spatially delineated zones in a menu defined relative to a physical position of the wearable audio device, in response to the initiation trigger, wherein each audio choice is associated with a selection from the menu, wherein the menu is rendered by an application programming interface (API) calling component from a set of inputs to an API interface, wherein the API interface permits insertion of the at least two distinct audio choices as audio files into pre-defined entries assigned to the spatially delineated zones;

receiving a selection command indicating selection of one of the audio choices, wherein the selection command comprises a gesture detected by a gesture detection system at the wearable audio device; and in response to receiving the selection command: a) initiating playback of audio content associated with the selected audio choice, b) adjusting a setting at the wearable audio device, c) entering an additional menu related to the selection command, or d) exiting the menu.

20. The computer-implemented method of claim 19, wherein the menu comprises four spatially delineated zones.

* * * * *